(12) United States Patent
Shore

(10) Patent No.: US 11,127,432 B2
(45) Date of Patent: *Sep. 21, 2021

(54) USER INTERFACE FOR METHOD FOR CREATING A CUSTOM TRACK

(71) Applicant: Rose Trading LLC, Dallas, TX (US)

(72) Inventor: Michael Wayne Shore, Dallas, TX (US)

(73) Assignee: ROSE TRADING LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,640

(22) Filed: Mar. 12, 2020

(65) Prior Publication Data

US 2020/0211598 A1 Jul. 2, 2020

Related U.S. Application Data

(63) Continuation of application No. 15/729,086, filed on Oct. 10, 2017, now Pat. No. 10,593,364, which is a (Continued)

(51) Int. Cl.
*H04N 5/93* (2006.01)
*G11B 27/031* (2006.01)
(Continued)

(52) U.S. Cl.
CPC ......... *G11B 27/031* (2013.01); *H04N 21/439* (2013.01); *H04N 21/4312* (2013.01);
(Continued)

(58) Field of Classification Search
CPC ............. G11B 27/031; H04N 21/4312; H04N 21/439; H04N 21/44016; H04N 21/4438;
(Continued)

(56) References Cited

U.S. PATENT DOCUMENTS 5,274,758 A 12/1993 Beitel et al.
6,597,375 B1 7/2003 Yawitz
(Continued)

FOREIGN PATENT DOCUMENTS

EP 0920014 A1 6/1999

OTHER PUBLICATIONS

Kennedy, "Avid Media Composer 5 Essential Training" Dated: 2012, Downloaded from webpage: http://www.lynda.com/Media-Composer-5-tutorials/avid-essential-training/Adding-shots-using-Splice/69615-4.html, Publication date: Jul. 7, 2010, 1 page.
(Continued)

*Primary Examiner* — Robert Chevalier
(74) *Attorney, Agent, or Firm* — Panitch Schwarze Belisario & Nadel LLP

(57) ABSTRACT

A system for allowing a user to create a custom track on a user apparatus, the user apparatus having a display is described. A memory stores a plurality of video clips and an audio track having a timeline. An application is stored in the memory. The application is configured to provide, on the display of the user apparatus, a plurality of video source windows, each of the plurality of video source windows corresponding to a respective one of the plurality of video clips. The application is further configured to allow the user to create the custom track while the audio track is playing by correlating portions of the plurality of video clips with the audio track by selecting respective ones of the plurality of video source windows at desired times in the timeline of the audio track.

12 Claims, 8 Drawing Sheets

Related U.S. Application Data continuation of application No. 14/972,441, filed on Dec. 17, 2015, now Pat. No. 9,788,064, which is a continuation of application No. 14/330,524, filed on Jul. 14, 2014, now Pat. No. 9,245,582, which is a continuation of application No. 13/523,099, filed on Jun. 14, 2012, now Pat. No. 8,867,902, which is a continuation of application No. 13/432,814, filed on Mar. 28, 2012, now Pat. No. 8,244,103.

(60) Provisional application No. 61/468,929, filed on Mar. 29, 2011.

(51) Int. Cl.
  *H04N 21/44* (2011.01)
  *H04N 21/472* (2011.01)
  *H04N 21/431* (2011.01)
  *H04N 21/439* (2011.01)
  *H04N 21/8547* (2011.01)
  *H04N 21/443* (2011.01)

(52) U.S. Cl.
  CPC ... *H04N 21/44016* (2013.01); *H04N 21/4438* (2013.01); *H04N 21/47202* (2013.01); *H04N 21/47205* (2013.01); *H04N 21/8547* (2013.01)

(58) Field of Classification Search
  CPC ....... H04N 21/47202; H04N 21/47205; H04N 21/8547
  USPC ........ 386/278, 285, 281, 280, 286, 230, 231
  See application file for complete search history.

(56) References Cited

U.S. PATENT DOCUMENTS

| | | | |
|---|---|---|---|
| 6,674,955 B2 | 1/2004 | Matsui et al. | |
| 7,512,886 B1 | 3/2009 | Herberger et al. | |
| 7,623,755 B2 | 11/2009 | Kuspa | |
| 7,739,599 B2 | 6/2010 | Patten et al. | |
| 7,814,421 B2 | 10/2010 | Reynolds et al. | |
| 7,823,056 B1 | 10/2010 | Davey et al. | |
| 7,836,389 B2 | 11/2010 | Howard et al. | |
| 7,882,258 B1 | 2/2011 | Sumler et al. | |
| 8,244,103 B1 | 8/2012 | Shore | |
| 8,867,902 B2 | 10/2014 | Shore | |
| 9,245,582 B2 | 1/2016 | Shore | |
| 9,788,064 B2 | 10/2017 | Shore | |
| 2004/0117831 A1* | 6/2004 | Ellis | H04N 21/485 725/53 |
| 2006/0087941 A1 | 4/2006 | Obradovich | |
| 2008/0044155 A1 | 2/2008 | Kuspa | |
| 2009/0273712 A1 | 11/2009 | Landy | |
| 2010/0042682 A1 | 2/2010 | Kaye | |
| 2010/0118033 A1 | 5/2010 | Faria | |
| 2010/0183280 A1 | 7/2010 | Beauregard et al. | |
| 2011/0107214 A1 | 5/2011 | Kouznetsov et al. | |
| 2011/0123972 A1 | 5/2011 | Friedman | |
| 2011/0238507 A1 | 9/2011 | Ben-Rubi | |
| 2012/0263432 A1 | 10/2012 | Shore | |
| 2015/0100886 A1 | 4/2015 | Ubillos | |

OTHER PUBLICATIONS

Spruce Technologies, "DVD Authoring System Version 2.5 Release Notes", 476 pages (Dec. 1, 1999).

Baldwin, "How to Sync Photos to Music", Downloaded from webpage: http://www.ehow.com/how_7191289_sync-photos-music.html, downloaded Mar. 26, 2012, publication date: unknown, 7 pages.

Kobler, "Moving Clips to the Timeline in Final Cut Pro HD", Dated 2012, Downloaded from webpage: http://www.dummies.com/how-to/content/moving-clips-to-the-timeline-in-final-cut-pro-hd.html, Download Date: Mar. 26, 2012, Publication Date: unknown, 3 pages.

Digicams, "Working with Audio on Timeline in Premier", Downloaded from webpage: www.steves-digicams.com/knowledge-center/how-tos/photo-software/working-with-audio-on-timeline-in-premiere.html, Download Date: Mar. 26, 2012, Publication Date: unknown, 2 pages.

Office Action dated May 28, 2014 in U.S. Appl. No. 13/523,099 by Shore.

Office Action dated Feb. 27, 2017 in U.S. Appl. No. 14/972,441, by Shore.

* cited by examiner

USER INTERFACE FOR METHOD FOR CREATING A CUSTOM TRACK

CROSS-REFERENCE TO RELATED APPLICATIONS

This application is a continuation of U.S. patent application Ser. No. 15/729,086, filed on Oct. 10, 2017, entitled "User Interface For Method For Creating a Custom Track," currently pending, which is a continuation of U.S. patent application Ser. No. 14/972,441, filed on Dec. 17, 2015, entitled "User Interface For Method For Creating a Custom Track," now U.S. Pat. No. 9,788,064, which is a continuation of U.S. patent application Ser. No. 14/330,524, filed on Jul. 14, 2014, entitled "User Interface For Method For Creating a Custom Track," now U.S. Pat. No. 9,245,582, which is a continuation of U.S. patent application Ser. No. 13/523,099 filed Jun. 14, 2012, entitled "User Interface For Method For Creating a Custom Track," now U.S. Pat. No. 8,867,902, which is a continuation of U.S. patent application Ser. No. 13/432,814 filed Mar. 28, 2012, entitled "User Interface For Method For Creating a Custom Track," now U.S. Pat. No. 8,244,103, which claims the benefit of U.S. Provisional Patent Application No. 61/468,929 filed Mar. 29, 2012, the entire contents of all of which are incorporated by reference herein.

BACKGROUND OF THE INVENTION

Embodiments of the present invention generally relate to the storage and creation of video and/or audio tracks and, more particularly, to creating custom video tracks from multiple video sources.

Millions of music fans attend concerts at numerous venues every year. As many artists and recording companies have recognized, video and/or audio recordings of live concerts are a very popular and successful sales item. However, in most cases fans must wait for months, if not years, to obtain quality live recordings of a concert—if the recordings are available at all. In addition, many fans would prefer to have a recording of the concert that they attended as opposed to another venue that was chosen either by the artist or recording company for mass production.

It is desirable to allow a user to create and purchase video tracks, audio tracks, still images, or any combination thereof from a performance that was captured via audio and/or video, e.g., a concert or a pay-per-view television show. It is further desirable to provide a user interface that simplifies the process of creating a custom track from multiple video clips.

BRIEF SUMMARY OF THE INVENTION

One preferred embodiment of the present invention is directed to a method for creating a custom track. The method includes providing a plurality of video clips from a memory and providing, on a display, a plurality of video source windows. Each of the plurality of video source windows corresponds to a respective one of the plurality of video clips. The method further includes providing an audio track from the memory. The audio track has a timeline. The method further includes allowing a user to create the custom track while the audio track is playing by correlating portions of the plurality of video clips with the audio track by selecting respective ones of the plurality of video source windows at desired times in the timeline of the audio track.

Another embodiment of the present invention is directed to a system for allowing a user to create a custom track on a user apparatus. The user apparatus has a display. The system includes a memory storing a plurality of video clips and an audio track having a timeline, and an application stored in the memory. The application is configured to provide, on the display of the user apparatus, a plurality of video source windows. Each of the plurality of video source windows corresponds to a respective one of the plurality of video clips. The application is further configured to allow the user to create the custom track while the audio track is playing by correlating portions of the plurality of video clips with the audio track by selecting respective ones of the plurality of video source windows at desired times in the timeline of the audio track.

Yet another embodiment is directed to a non-transitory computer readable storage medium comprising computer readable instructions for controlling a computer to create a custom track by executing the steps of providing a plurality of video clips from a memory; providing, on a display, a plurality of video source windows, each of the plurality of video source windows corresponding to a respective one of the plurality of video clips; providing an audio track from the memory, the audio track having a timeline; and allowing a user to create the custom track while the audio track is playing by correlating portions of the plurality of video clips with the audio track by selecting respective ones of the plurality of video source windows at desired times in the timeline of the audio track.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE PREFERRED EMBODIMENTS

Figure 1:
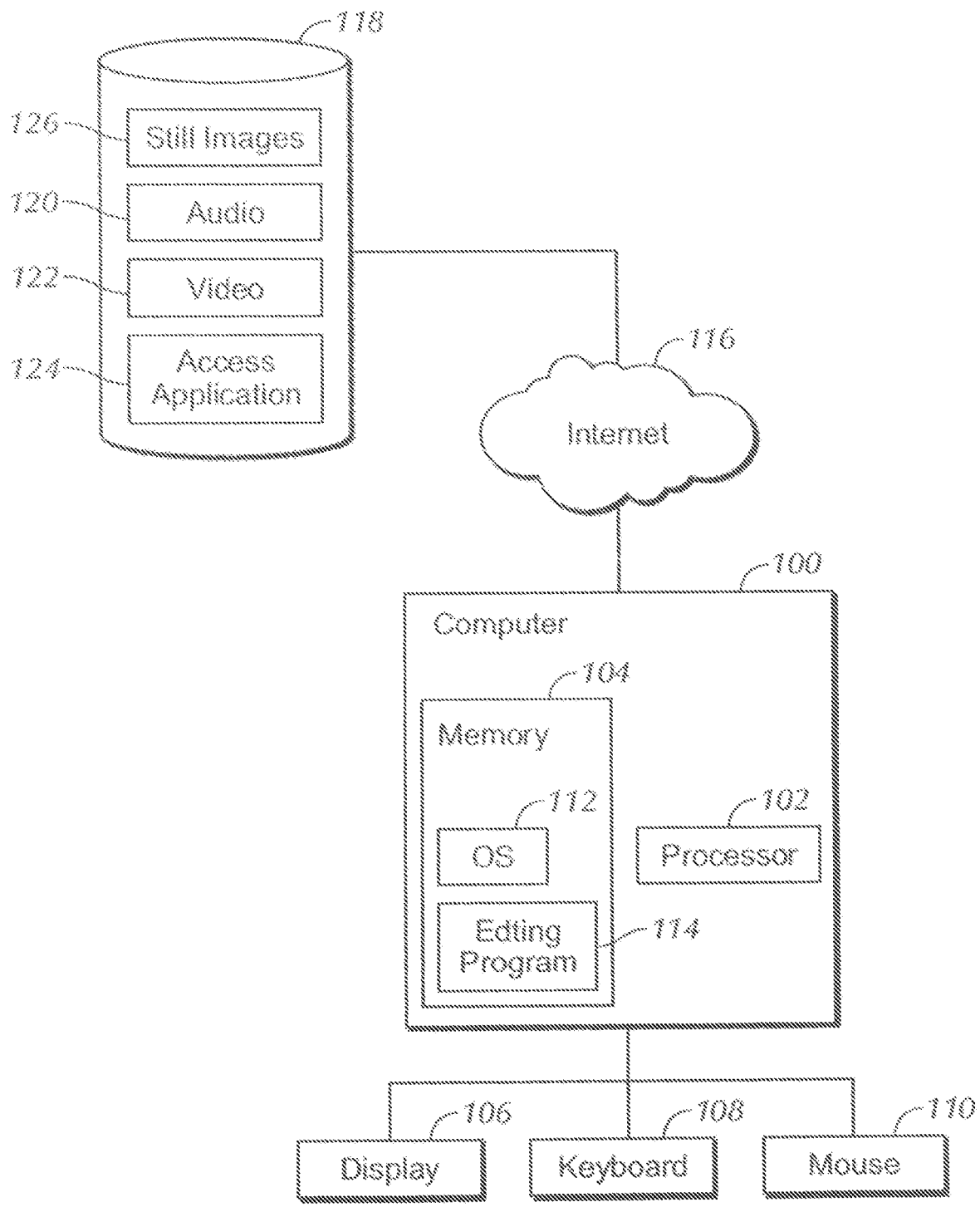
FIG. 1 is a schematic block diagram of a system in accordance with one embodiment of the present invention.

FIG. 1 illustrates a computer 100 for use with some of the embodiments of the present invention. The computer 100 is operated by a user or a venue to create a video or audio track. The computer 100 includes a processor 102, memory 104, a display 106, a keyboard 108, and a mouse 110. Stored within the memory 104 is at least an operating system 112 and an editing program 114. The editing program 114 is used to create the video or audio tracks. The computer 100 accesses a server 118 storing video tracks 122, audio tracks 120, still images 126, and an access application 124 through the Internet or a private network.

The server 118 stores audio tracks, video tracks, and/or still images 126 that may be obtained from various cameras and sound receiving devices at venues located around the world. The tracks may be fed to the server 118 live via streaming video and audio, the tracks may be stored in another location and then downloaded to the server 118, or a combination thereof. For example, a venue may choose to download the tracks to another location or system in order to manipulate the files to include timing information or perform other editing of the tracks. The venue may also add embedded information regarding the date of recordation and the venue name. In addition, some venues may wish to delay user access to the tracks until after the concert has ended. Although embodiments of the present invention may reference a live musical performance, embodiments of the present invention are also applicable to backstage recordings, television shows, pay-per-view shows, or the like. According to aspects of the present invention, a user may edit or customize the viewing of, e.g., a basketball game, a television show, or a reality television show by switching camera angles, audio tracks, or the like.

In addition, the tracks available for download at the server 118 may be ISO images, streaming video, or other format such as MP3, or MPEG2 or 4. Streaming video allows for digital rights management (DRM) to prevent unauthorized copying of content. ISO images may have a DRM watermark to identify unauthorized reproductions. Although embodiments of the present invention may use ISO images, streaming video, and watermarks, it will be readily understood by one skilled in the art that various other formats of video and video protection may be utilized without departing from aspects of the present invention.

The tracks may also be tiered based on a specific relationship, such as time or number of hits. For example, the first tier may be the most recent tracks to be added to the server 118 and/or the tracks with the most hits. The second tier may be made up of less requested tracks and/or tracks that have been available for a specific length of time, e.g., one month, one year, or the like. The older or least favorite tracks may then be archived. The first tier of tracks may be provided to the user by default, or all tracks from all tiers may be provided to the user for selection.

Figure 2:
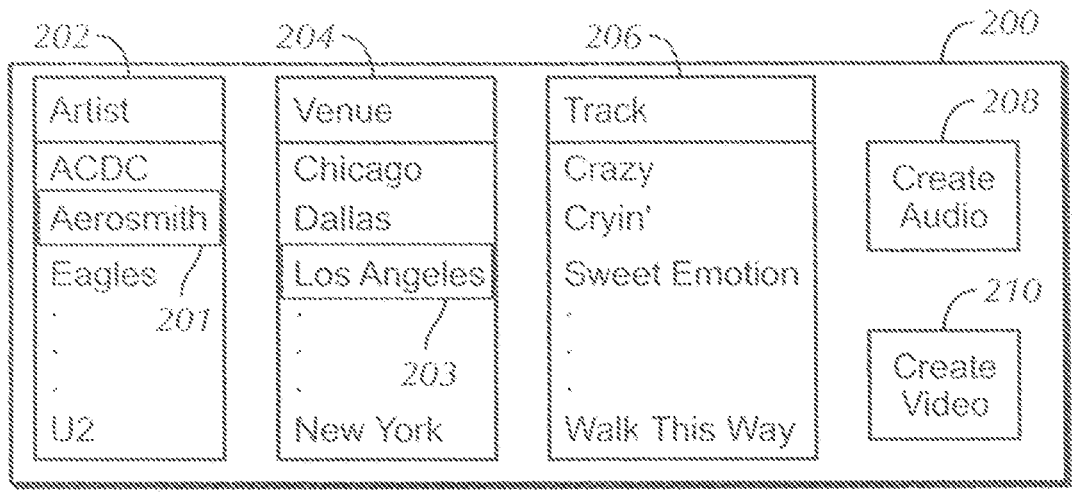
FIG. 2 is a screen shot in accordance with an embodiment of the present invention.

When tracks become available at the server 118 for download by the public, the access application 124 may be initiated to allow a user to select and purchase video tracks, audio tracks, still images, or any combination thereof. FIG. 2 illustrates an exemplary screen shot of the access application 124 in accordance with an embodiment of the present invention. Although the access application 124 is shown and described with a particular layout, it will be readily apparent to one skilled in the art that many aspects of the screen shot may be altered without departing from embodiments of the present invention.

A user, through the computer 100, accesses the Internet 116 in order to start the access application via the screen shown in the screen shot 200. The screen shot 200 includes an artist window 202, a venue window 204, and a track window 206. The windows 202, 204, 206 are preferably menus that provide values for selection by the user. The windows 202, 204, 206 may be provided as complete menus, scrolling menus, drop-down menus, or other formats of presenting selections to a user. Although the menus shown are directed to the categories of artists, venues, and tracks (or songs), other categories may be utilized, such as shows, camera angles, audio tracks, or the like. For example, the user may be presented with a list of individuals from which to select, and a subsequent menu may be populated with artists associated with the selected individual.

Preferably, based at least in part on a first selection such as "Aerosmith" 201 made by the user from a menu, a second menu is populated with values from a second category, wherein the values are associated with the selection from the first menu. For example, if the user selected the artist Aerosmith, the venue window 204 may populate or adjust selections accordingly. For instance, the venues available for selection in the venue window 204 would be the venues at which Aerosmith has played. A further selection such as "Los Angeles" 203 made by the user from the venue window 204 may also cause the track window 206 to populate or adjust selections of songs performed by Aerosmith in a concert performed in Los Angeles. It is understood that any number of categories and menus may be utilized, with selections by the user providing the path to obtaining clips for use in creating the custom track.

Although the adjustment or population of selections in the windows 202, 204, and 206 is preferred, it is also possible to merely black out non-available selections or leave all selections available regardless of previous selections made by the user. The user may select one or more tracks at a time in order to create a compact disc (CD) or audio track of one or more songs or a digital video disc (DVD) or video track of one or more performances at one or more venues.

When the user has determined the artist, venue, and track or portion of a track from which he wishes to create a video or audio track, the user then determines to create either an audio track via selection button 208 or a video track via selection button 210.

Figure 3:
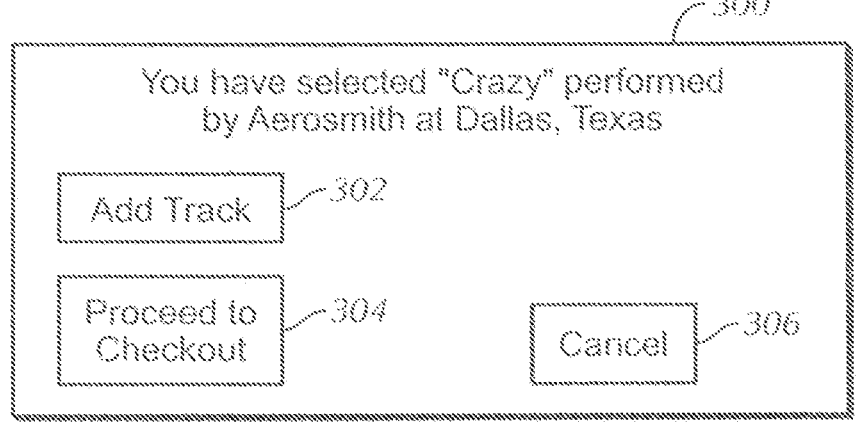
FIG. 3 is a screen shot in accordance with an embodiment of the present invention.

If the user presses button 208, the user proceeds to screen shot 300 illustrated in FIG. 3. The user may either add additional tracks to the previously selected track via button 302 or proceed to checkout via button 304. The user may also cancel the order by pressing a cancel button 306. In addition, although the following descriptions relate to creating a custom video track from multiple camera sources, it will be understood by one skilled in the art that a user may create custom audio tracks from multiple sound recording devices. In a manner similar to that shown in FIGS. 5-8, a user may select a particular sound recording device from multiple sound recording devices placed strategically throughout the venue. For example, the user may wish to purchase an audio track composed of audio recorded from a device near a drummer, a device near the lead singer, and a device near the lead guitarist or any combination thereof.

Figure 4:
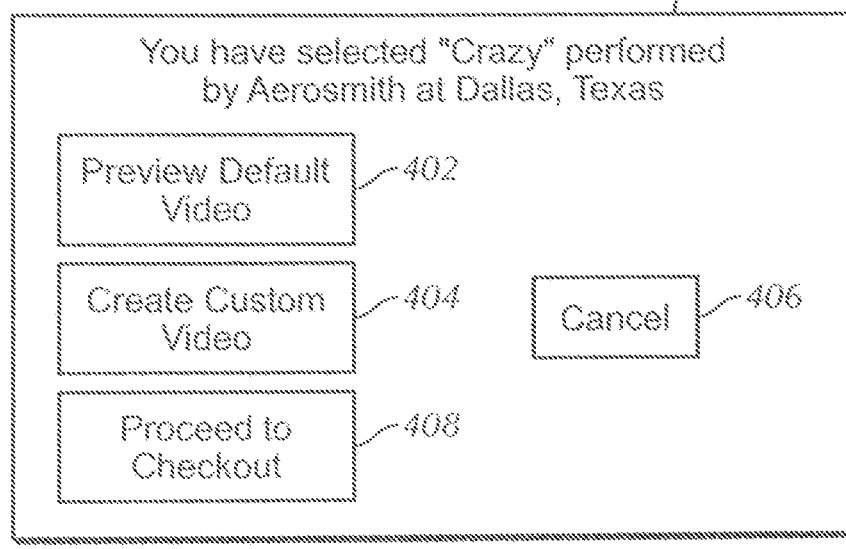
FIG. 4 is a screen shot in accordance with an embodiment of the present invention.

Instead, if the user presses button 210, the user proceeds to screen shot 400 illustrated in FIG. 4. Although the remainder of the process will be described with reference to one video track, as noted above, it is also contemplated that the user may select multiple video tracks, multiple audio tracks, or a combination of both.

In a preferred embodiment of the screen shot 400 shown in FIG. 4, a confirmation of the chosen track, artist, and venue appears on the screen. The access application 124 provides the option of previewing a default video track previously created for purchase by pressing button 402. The user may instead prefer to create a custom video track by pressing button 404. If the user selects the default video track, the user may preview the track with, for example, a pop-up window. The user may then choose to purchase the default video track or cancel the operation and create a custom video track. If the user selects the default video track, he may then select additional video tracks to include in his purchase, or the user may purchase the one video track by selecting the proceed to checkout button 408. The user may also cancel the order by pressing the cancel button 406.

Figure 5:
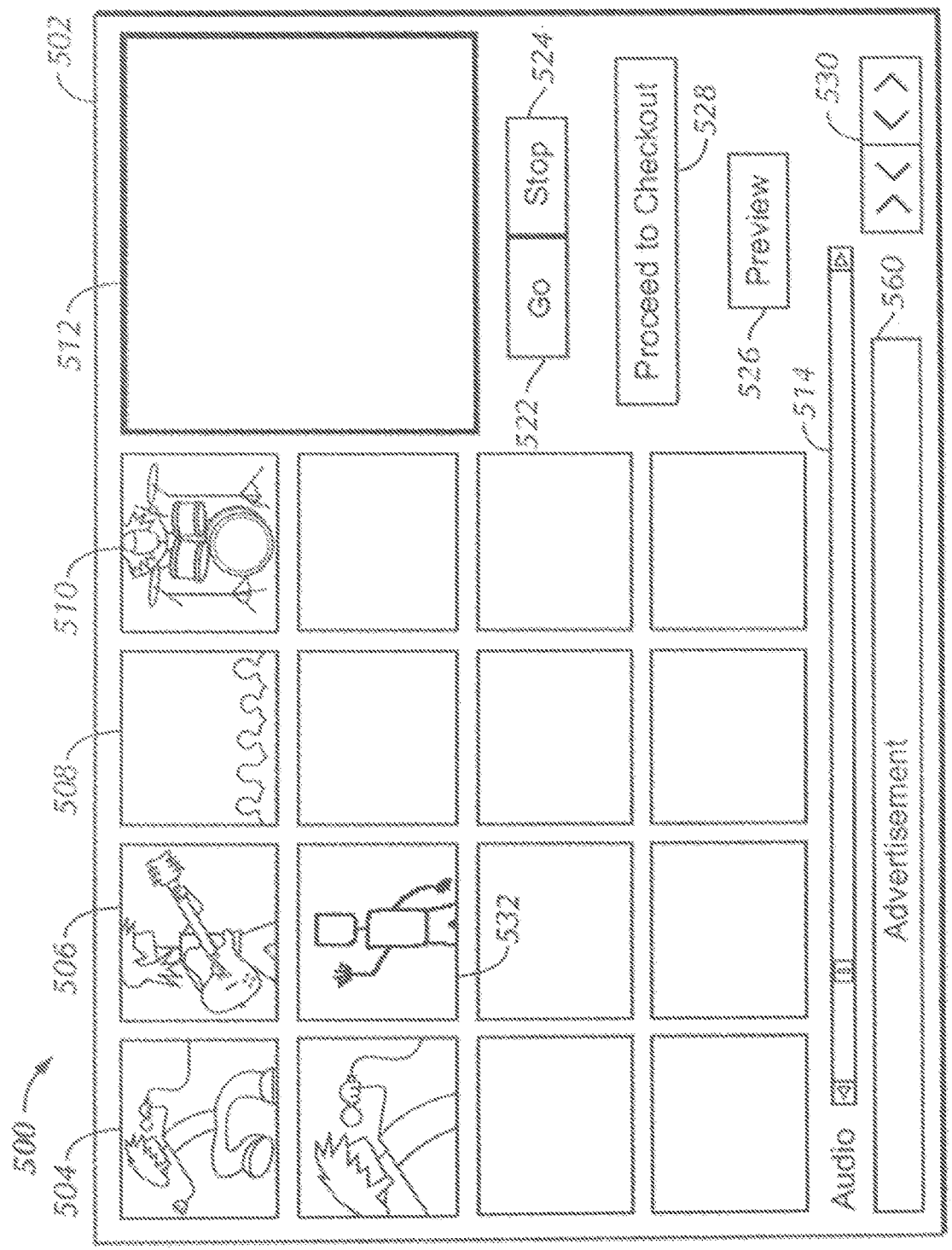
FIG. 5 is a screen shot in accordance with an embodiment of the present invention.

If the user decides to create a custom track, he preferably proceeds to screen shot 500 illustrated by FIG. 5. Although the following video editing application is described with particular characteristics, it will be understood by one skilled in the art that any method of video editing may be used in accordance with embodiments of the present invention.

In a preferred embodiment, a user interface 502 is provided on the screen 500. The user interface 502 includes a plurality of video source windows (e.g., 504, 506, 508, 510), each of which is associated with one of a plurality of video clips. For example, multiple cameras may have recorded various areas of the stage and/or crowd during a concert. The video source windows (e.g., 504, 506, 508, 510) may display a still image from the associated video clip, may feature a preview video of the associated video clip, or the like. In FIG. 5, sixteen video source windows are shown, though any number of video source windows may be displayed. When there are fewer video clips than available video source windows for display, video source windows are preferably only presented to the user for existing video clips. Alternatively, disabled video source windows may be displayed. When the number of video clips exceeds the number of video source windows available for display, users may scroll or flip through multiple pages, rows, columns, or the like of video source windows. Additionally, the video clips need not be derived entirely from the live musical performance. Users may be provided the option to upload or import at least one of their own video clips 532. The personal clips 532 may be home videos, Internet clips, or the like.

An audio slider 514 is provided and indicates playback progress of a timeline of a selected audio track. The user selects the "Go" button 522 to initiate play of the audio track and movement of the audio slider 514. While the audio track is playing, the user creates the custom track by correlating portions of the video clips with the audio track. Specifically, at desired times in the timeline of the audio track, the user selects a video source window. As the audio track plays, a corresponding portion of the presently selected video clip also plays and is matched up with the simultaneously playing portion of the audio track to create the custom track. In preferred embodiments, the user may, prior to playback of the audio track pre-select and arrange the video clips displayed on the screen, to prevent clutter and to allow the user to more easily choose from and select the desired video clips during playback of the audio track.

Typically, at least a portion of the video clips will be from the same live musical performance as the selected audio track, and will therefore be synchronized with the audio track. When the user selects a synchronized video clip during custom track formation, the portion of the video correlated with the audio track for purposes of the custom track will preferably be the corresponding portion of the selected video clip that was previously synchronized with the currently playing portion of the audio track. Thus, the user is assured that the selected portions of the video clips showing artist performance appropriately match up with the corresponding audio, and no visible delay between picture and sound is created. Preferably, the synchronized clips are played simultaneously with the audio track in their respective video source windows. This allows the user to better decide which video clips to use during playing of the audio track. In preferred embodiments, the video clips for each song, venue, or musical performance share a single default audio track.

A preview window 512 is provided for viewing the custom track. While the audio track is playing, the preview window 512 displays the presently selected one of the plurality of video clips to inform the user as to which of the clips is presently being correlated with the audio track for creation of the custom track. The preview window 512 can also be utilized to view the custom track once the audio track has completed. Preferably the audio track runs through completion, but the user may stop playback at any time using the "Stop" button 524. Playback and creation may be resumed from the same point by again selecting the "Go" button 522. However, an option to reset the audio track in the event of an error may also be provided. A zoom button 530 may also be provided to allow the user to zoom in or out on the presently selected video clip. A zoom function performed during playback of the audio track is preferably recorded into the final custom track.

Figure 6:
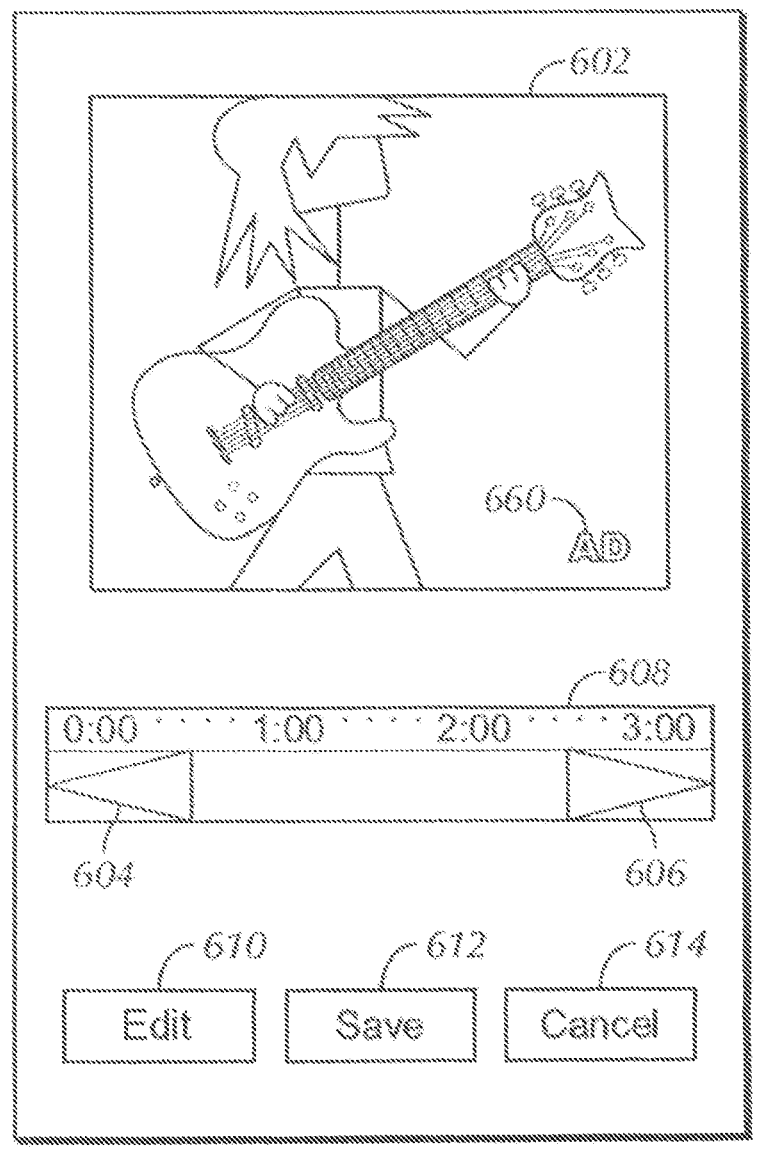
FIG. 6 is a screen shot in accordance with an embodiment of the present invention.

Once playback of the audio track is completed, the user may select the Preview button 526, which preferably expands the preview window 512 into a larger review window 602, as shown in FIG. 6. The custom track may be reviewed in the review window 602 using the playback controls 604, 606 with the assistance of an accompanying time line 608. If the user is satisfied with the custom track, the user may select "Save" 612 to save the custom track and thereafter proceed to a purchase or payment screen. The user may also have the option to publish the custom track for viewing and use by other users. If the user wishes to return to the prior screen 500, the user may select "Cancel" 614. The user is also offered the option to edit the custom track by selecting the "Edit" button 610.

Figure 7:
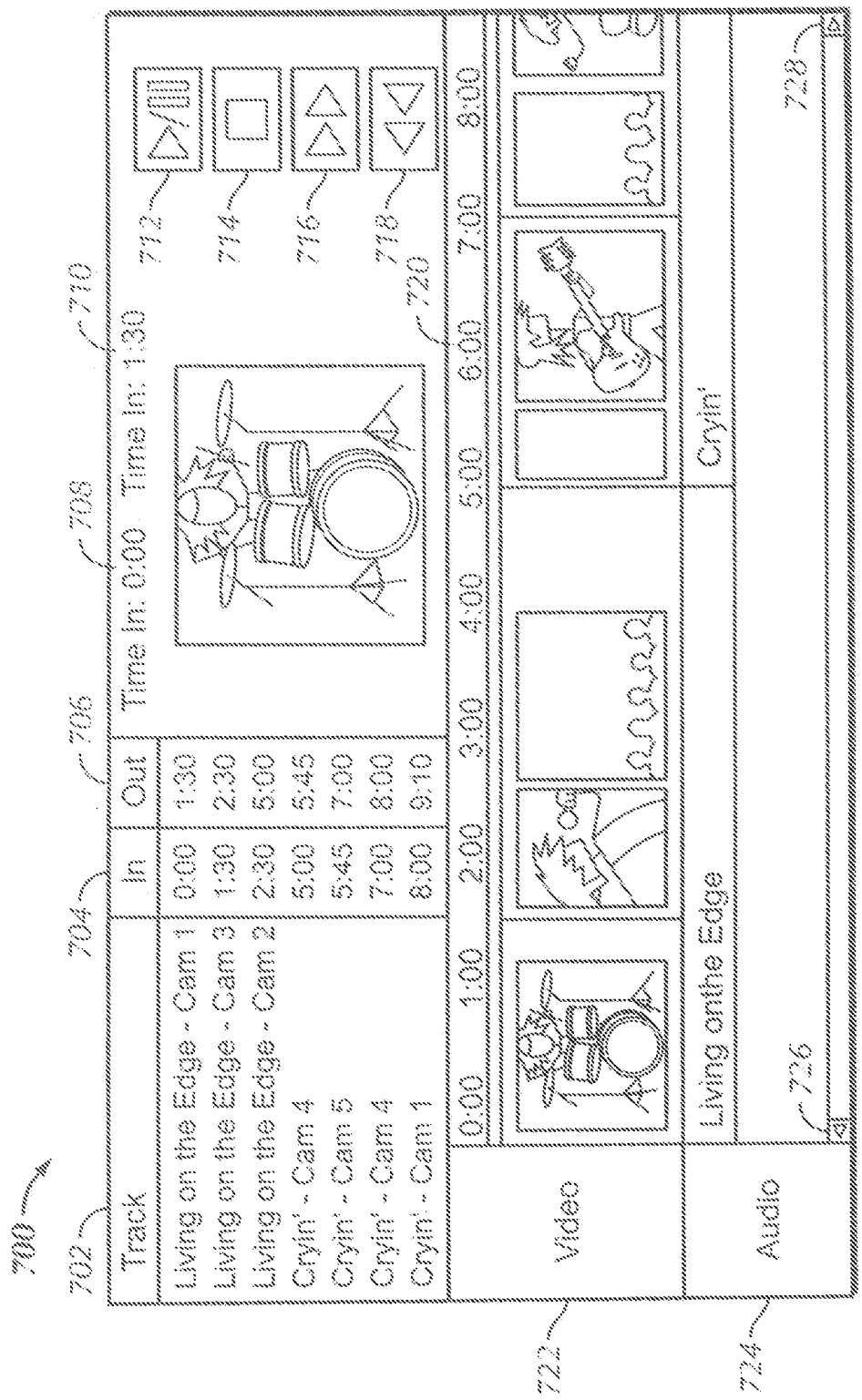
FIG. 7 is a screen shot in accordance with an embodiment of the present invention.

FIG. 7 illustrates one embodiment of an editing screen 700 for editing the custom track. In this screen shot 700 an upper portion of the screen allows a user to view the selected clips in a track window 702. The in and out times resulting from the user selections made using the screen 500 are also viewable through an in window 704 and an out window 706. The user may add, remove, select, delete, or the like, tracks from the track window 702 as desired. The remainder of the upper portion of the screen may be used to view the video clips and edit the in and out times. For example, a time in window 708 allows the user to edit the in time of the chosen video clip. Similarly, a time out window 710 allows the user to edit the out time of the chosen video clip. The user may play, pause, stop, rewind, or fast forward the video clip as desired with buttons 712, 714, 716, and 718.

A lower portion of the screen 700 may be devoted to timing of the video clips. In this embodiment, a time bar 720 is shown along with the selected clips at their respective in and out times. The lower portion of the screen 700 may include a video portion 722 for viewing the selected video clips and an audio portion 724 for playing the selected audio tracks. In addition, the lower portion may include scroll buttons 726 and 728 for scrolling through the edited tracks.

Figure 8:
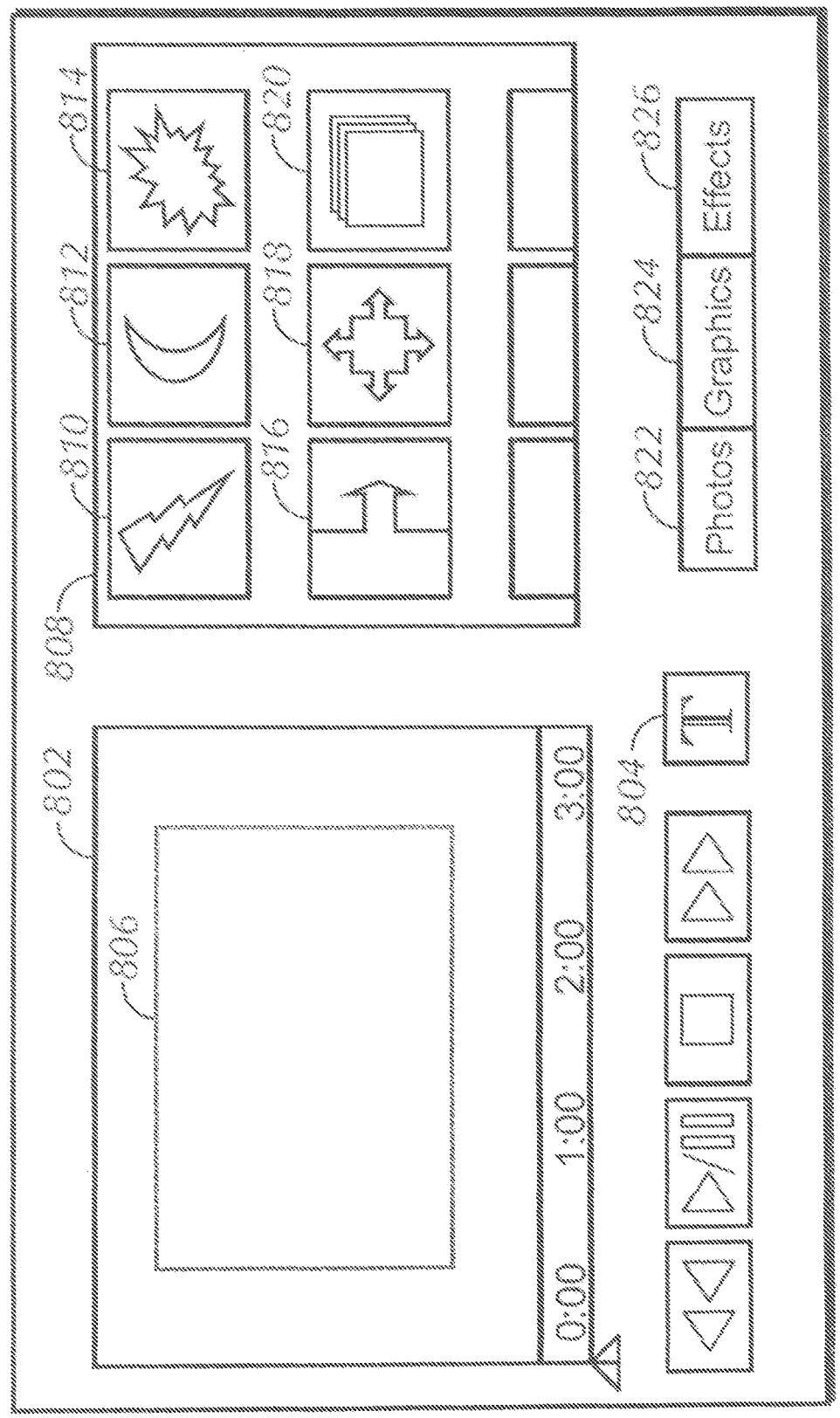
FIG. 8 is a screen shot in accordance with an embodiment of the present invention.

FIG. 8 illustrates an embodiment of an editing screen 800 for adding effects and the like to the custom track. The editing screen 800 includes a preview screen 802 as before. The user may select an "Add Text" button 804 to add one or more text overlays to the custom track. Preferably, selection of the "Add Text" button 804 places a text box 806 in the preview screen 802 for the user to type and place the text in the appropriate area of the video. The user is also presented with an effects menu 808, which may contain, for example, video effects 810, 812, 814, transitions 816, 818 (such as fades, sliding screens, or the like), zooms 820, or like effects. The user may also switch between menus 808 by selection of a "Photos" button 822, which will provide one or more photos that the user may incorporate into the custom track, a "Graphics" button, which will provide one or more graphics that the user may insert or overlay into the custom track, and an "Effects" button, which provides the previously described menu of effects.

Referring back to FIG. 5, at least one advertisement 560 may be provided to the user. The advertisement 560 may be interactive and is preferably in the form of a banner advertisement, although the advertisement could also be in the form of a separate web page that is temporarily displayed before, during, or after access to the program, or may be a commercial that is displayed with the custom track, or the like. The advertisement 560 may also change based on elapsed time, changing pages, or the like. Multiple advertisements 560 may also be displayed. It will be understood by those skilled in the art that the owner of the access application is typically compensated by an advertiser in exchange for displaying the advertisement 560. The advertisement may also be a watermark 660 (see FIG. 6) on the custom track. The watermark 660 may be a temporary watermark or a watermark that is displayed throughout playback of the custom track. The advertisement may sponsor at least one song or a series of songs in the custom track, a segment of the custom track, or the like.

Figure 9:
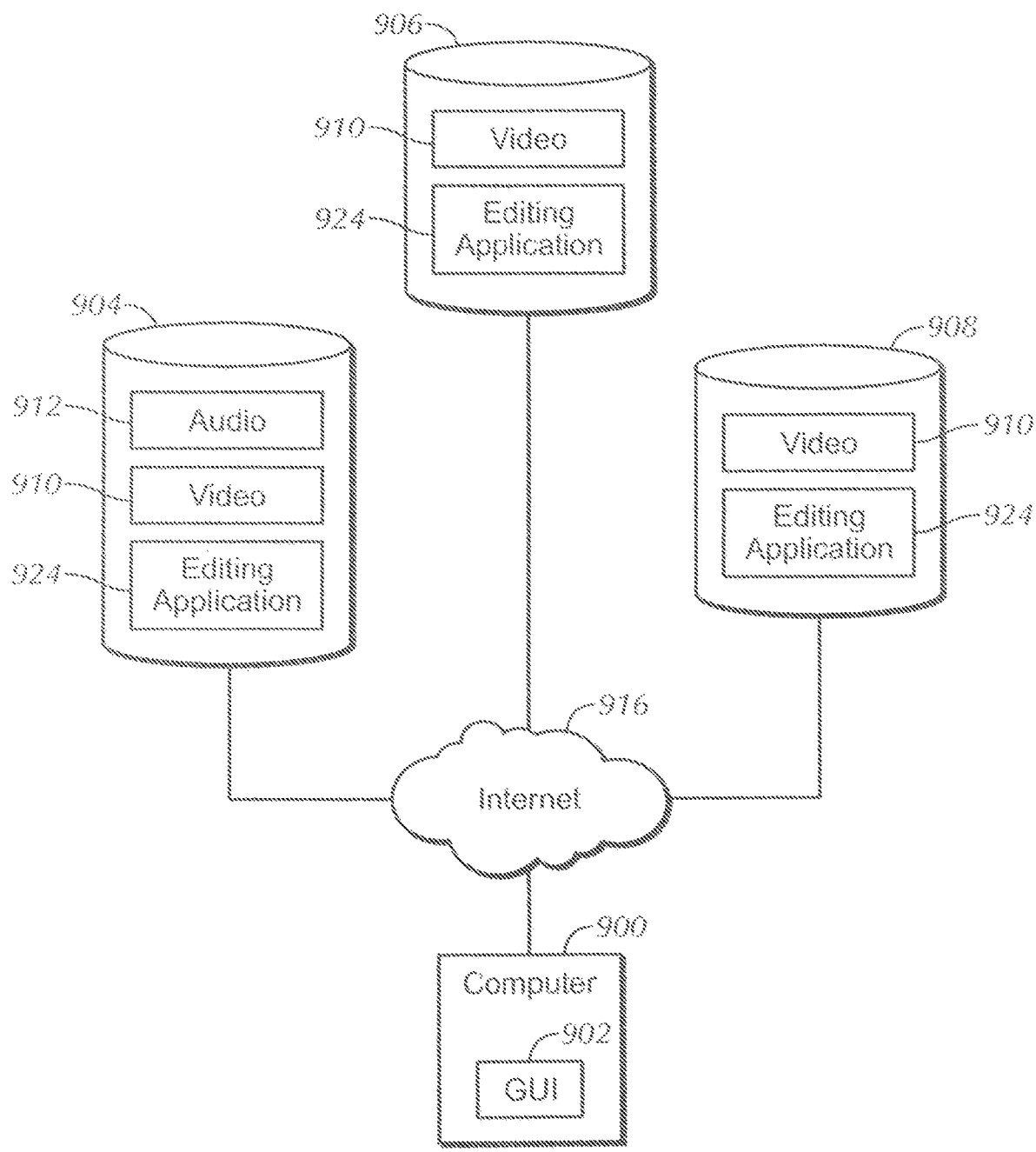
FIG. 9 is a schematic block diagram of a system in accordance with an embodiment of the present invention.

FIG. 9 illustrates an alternate embodiment of a system of the present invention in which the user may access the Internet 916 via a computer 900 in order to access a web-based editing application 924. In this embodiment, the computer 900 accesses servers 904, 906, and 908 to create and purchase audio and/or video tracks. The servers 904, 906, 908, store video tracks 910, audio tracks 912, and an editing application 924. The editing application 924 and access to stored video and audio tracks 910 and 912 are run remotely via a graphical user interface (GUI) 902 at the user computer 900. The GUI 902 allows the user to view, create, and edit video and audio tracks 910 and 912 in a manner similar to that shown in FIGS. 2-8.

Although the present embodiment illustrates three servers 904, 906, 908 for storing video and audio tracks as well as the editing application, it will be understood by one skilled in the art that fewer servers or more servers may be utilized in accordance with aspects of the present invention. A distributed, networked system as shown can allow storage capacity in the petabyte range with downloads of a gigabyte-per-second or more. By adjusting the number of servers, the type of storage systems used, as well as utilizing parallel data input and output, storage capacity and download speed can be increased or decreased as desired and as economics dictate. For example, a petabyte of storage and gigabyte-per-second download speeds support the storage and download of high-definition digitized video, should the user desire high-definition video.

Figure 10:
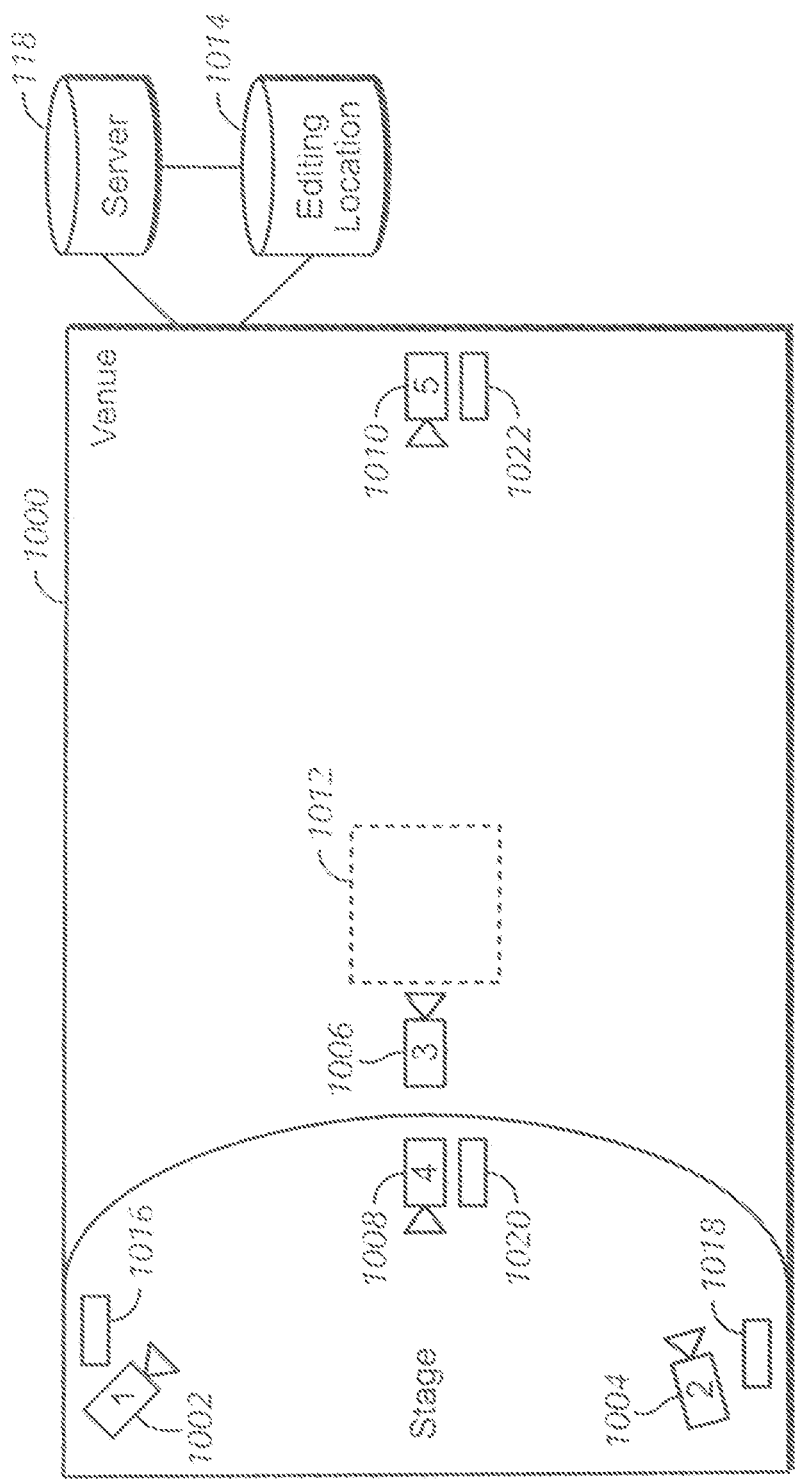
FIG. 10 is a schematic diagram of a system in accordance with an embodiment of the present invention.

FIG. 10 depicts an exemplary system for capturing video tracks in accordance with an embodiment of the present invention. As previously noted, a venue 1000 may wish to capture video from several angles from one or more cameras 1002, 1004, 1006, 1008, and 1010. In the preferred embodiment, there are several cameras 1002, 1004, 1006, 1008, and 1010 that capture video from several different locations. For example, cameras 1 and 2 1002 and 1004 may capture video from the rear corners of the stage. Camera 3 1006 may capture video of the audience. The cameras may pan to different areas or specifically capture only one location. Camera 3 1006 may be fixed to a particular location, such as an area 1012 defined by the venue 1000. Members of the audience may stand in the designated area 1012 to ensure that they are captured on the video of camera 3 1006. In the preferred embodiment, camera 5 1010 is located at the far end of the venue 1000 from the stage. In a similar manner, sound recording devices 1016, 1018, 1020, 1022 may also be placed throughout the venue 1000, either together or separate from the video cameras 1002, 1004, 1006, 1008, 1010. Although the preferred embodiment shown in FIG. 10 depicts a particular camera/sound recording device layout with five cameras and four sound recording devices, it will be understood by one skilled in the art that fewer cameras and recording devices or more cameras and recording devices may be utilized and the placement of the cameras/sound recording devices may be varied as desired by the particular venue 1000.

In preferred embodiments, tickets are made specially available for seats in the designated area 1012. The tickets may be made available for purchase directly from the system operator, or the user may be redirected to a third party vendor. In some instances, the designated area 1012 may not include seats, and it may be necessary to provide users the option to purchase or obtain blocks of time to be present in the designated area 1012. This option allows more users to be filmed and an opportunity to generate increased revenue.

The video recorded from the camera 1002, 1004, 1006, 1008, and 1010 may be fed to the server 118 for availability to the public, or the video may be fed to an editing storage location 1014. Alternatively, the video could be fed to both the server 118 and the editing storage location 1014. At the editing storage location 1014, the video can be edited, default video tracks may be set up, digital management rights and/or watermarks may be embedded, or other actions may be performed on the video. Once the actions are completed, the video may be uploaded to the server 118. One server 118 is illustrated in this particular embodiment, however, as previously described with reference to FIG. 9, several servers may be utilized in conjunction with embodiments of the present invention.

In addition, the venue 1000 may allow attendees of the concert a discount, a credit, or a certain number of free downloads in exchange for paying for a ticket to the concert. For example, the venue 1000 may stamp or print a discount or coupon code on the ticket itself or hand out coupons at the venue 1000 itself. The attendee may then go to the Internet, access the GUI or application and enter the discount code when creating a track. Also, the venue may receive a fee for every purchased track recorded at that venue. Preferably, the discount or coupon code is limited to a predetermined number of uses, and the predetermined number may be tied to the purchase price of the ticket, that is, more uses are available for a higher ticket purchase price.

It is to be understood that the above-described embodiments are simply illustrative of the principles of the present invention. Various modifications may be made by those skilled in the art without departing from aspects of the embodiments of the present invention. For example, various changes may be made to the graphical user interface (GUI), access application, and screen shots depicted in FIGS. 2-8 while still embodying aspects of the present invention. In addition, the access application and/or the editing application may be stored at the user computer and not at the server. The methods and applications described above may be implemented in hardware, firmware, software, or combinations thereof, or in a computer program product tangibly embodied in a computer readable storage device. It should also be understood that where a video clip is illustrated in some of the exemplary embodiments, in some instances this can be simply an audio clip, a synchronized audio/video clip, or an unsynchronized audio/video stream.

I claim:

1. A method for creating a custom track, the method comprising:
   providing a plurality of video clips and an audio track from a memory, the audio track having a timeline;
   providing, on a display, a plurality of video source windows, each of the plurality of video source windows corresponding to a respective one of the plurality of video clips;
   allowing a user to create the custom track while the audio track is playing by correlating portions of the plurality of video clips with the audio track by selecting respective ones of the plurality of video source windows at desired times in the timeline of the audio track; and
   providing, on the display, at least one advertisement to the user.

2. The method of claim 1, wherein the at least one advertisement is in the form of one of a banner advertisement displayed with the plurality of video source windows, a commercial displayed with the custom track, a watermark displayed on the custom track, or a temporarily displayed web page.

3. The method of claim 1, wherein the at least one advertisement is interactive.

4. The method of claim 1, wherein the at least one advertisement changes based on elapsed time.

5. The method of claim 1, wherein the user accesses the memory using an Internet link.

6. A system for allowing a user to create a custom track on a user apparatus, the user apparatus having a display, the system comprising:
   a memory storing a plurality of video clips and an audio track having a timeline; and
   an application stored in the memory, the application being configured to:
   (i) provide, on the display of the user apparatus:
      (a) a plurality of video source windows, each of the plurality of video source windows corresponding to a respective one of the plurality of video clips, and
      (b) at least one advertisement, and
   (ii) allow the user to create the custom track while the audio track is playing by correlating portions of the plurality of video clips with the audio track by selecting respective ones of the plurality of video source windows at desired times in the timeline of the audio track.

7. The system of claim 6, wherein the application is configured to provide the at least one advertisement in the form of one of a banner advertisement displayed with the plurality of video source windows, a commercial displayed with the custom track, a watermark displayed on the custom track, or a temporarily displayed web page.

8. The system of claim 6, wherein the at least one advertisement is interactive.

9. The system of claim 6, wherein the application is configured to change the at least one advertisement based on elapsed time.

10. The system of claim 6, wherein the memory is provided by at least one server.

11. The system of claim 6, wherein the application stored in the memory is accessible over an Internet link.

12. A non-transitory computer readable storage medium comprising computer readable instructions for controlling a computer to create a custom track by executing the steps of:
    providing a plurality of video clips and an audio track from a memory, the audio track having a timeline;
    providing, on a display, a plurality of video source windows, each of the plurality of video source windows corresponding to a respective one of the plurality of video clips;
    allowing a user to create the custom track while the audio track is playing by correlating portions of the plurality of video clips with the audio track by selecting respective ones of the plurality of video source windows at desired times in the timeline of the audio track; and
    providing, on the display, at least one advertisement to the user.

* * * * *